March 27, 1956     A. A. REISER ET AL     2,739,482
MECHANISM FOR BALANCING A ROTATING BODY
Filed March 13, 1952     2 Sheets-Sheet 1
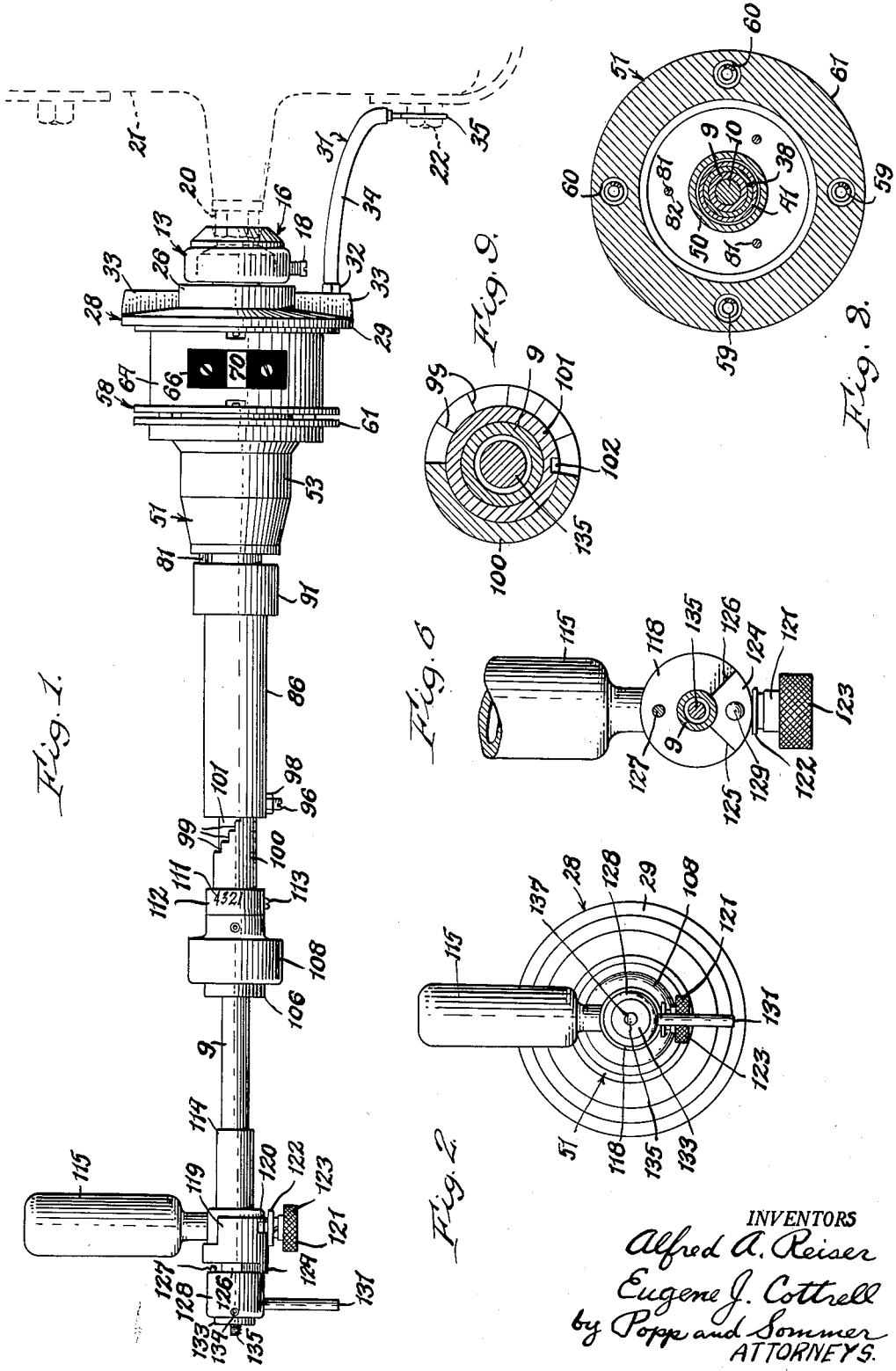
INVENTORS
Alfred A. Reiser
Eugene J. Cottrell
by Popp and Sommer
ATTORNEYS.

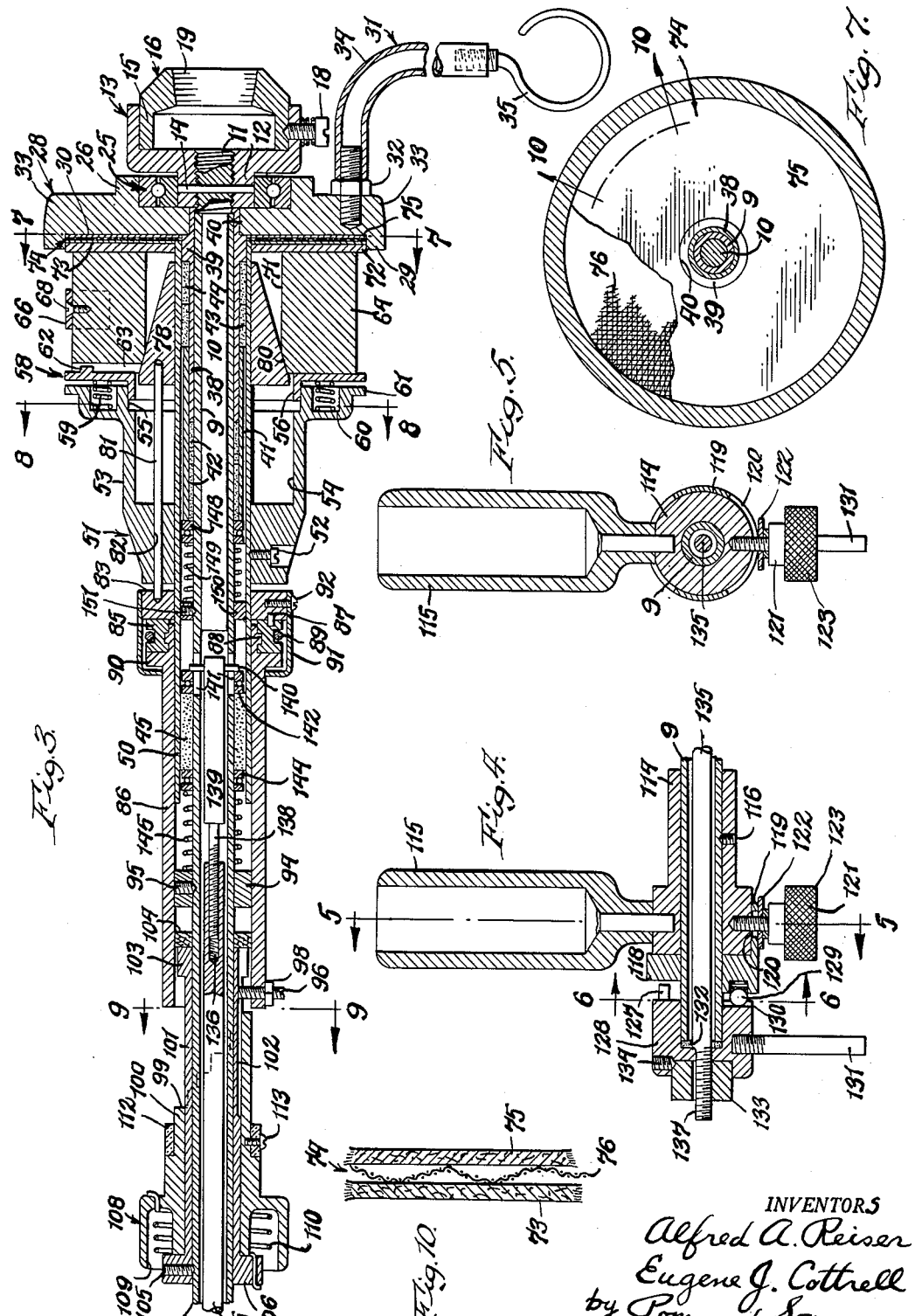

United States Patent Office 2,739,482
Patented Mar. 27, 1956

2,739,482
MECHANISM FOR BALANCING A ROTATING BODY

Alfred A. Reiser, Buffalo, and Eugene J. Cottrell, Eggertsville, N. Y.

Application March 13, 1952, Serial No. 276,422

23 Claims. (Cl. 73—458)

This invention relates to a mechanism for balancing a rotating body and is more particularly illustrated as embodied in a tool for balancing the unpowered front wheels of an automobile, although features of this invention can be employed wherever the balancing of a rotating body is required. In the balancing of such an automobile wheel a counterweight of a size determined by the operation of the tool is applied to the rim of the wheel at the point opposite its overweighted side, which point is also determined by the operation of the tool, and usually these weights are provided in increments of one-half ounce as measured at the rim of the wheel.

One of the principal objects of the invention is to provide a simple and reliable tool which is applied to the part to be balanced and which on rotating the part can be adjusted to show not only the size of the counterweight which must be applied to balance the part but also the radial position on the part at which the counterweight must be applied to balance the wheel.

Another object of the invention is to provide such a tool which is composed wholly of mechanically operated components thereby to avoid the necessity for electrical connections as well as avoiding the necessity for sensitive electrical parts.

Another object of the invention is to provide such a tool which is very rugged in construction and free from sensitive parts so that it will stand up under conditions of severe and constant use without getting out of order or requiring repairs.

Another object of the invention is to provide such a tool which will indicate both the location and amount of weight which must be added to the rotating part with a high degree of accuracy and at the same time is free from sensitive parts which would be likely to get out of order.

Another object of the invention is to provide such a tool which is extremely simple to operate so that it can readily be used by the average garage mechanic with little practice.

Another object of the invention is to provide such a tool which can be readily adjusted as to the rapidity of its response so that as the mechanic becomes more skilled he can increase the speed of its response.

A feature of the invention resides in the provision of a simple and reliable slipping clutch which will maintain the same degree of slippage for a long period of use, the invention essentially embodying the slippage of an externally weighted weight ring with reference to the rotating part to be balanced so that this weight ring rotates into phase with the unbalanced side of the rotating part where a high degree of vibration is observed and then travels 180° out of phase with the weighted side of the rotating part where a minimum vibration is observed since the weights tend to counterbalance each other.

Another feature of the invention resides in the provision of a simple adjustment, shown in increments of one-half ounce, of the effective weight of the weight ring and which is operated while the tool is in operation so that the operator can adjust the effect of this weight of the weight ring to counterbalance the overweight of the wheel when these weights travel through a relative position of 180° out of phase with each other. When this occurs no substantial vibration is observed and the operator is apprised as to how heavy a weight he has to add to the wheel to counterbalance it.

Another feature of the invention resides in the provision of a simple and reliable mechanism for quickly closing or locking the slipping clutch when this 180° out of phase relation obtains and when a minimum vibration is observed. By this means, on bringing the part to be balanced and the tool to rest, the weight of the weight ring is diametrically opposite the heavy point of the rotating part to be balanced and the operator is apprised as to where he must apply a weight, the value of which has been previously determined, to the part to be balanced in order to effect its balancing.

Another object of the invention is to provide a simple mechanism for attaching one part of the tool to a non-rotating part, such as the hub nut of a wheel, and another part of the tool to a rotating part, such as a rim nut of a wheel.

Another object is to provide such a tool which is light in weight so as to be easily applied to the part to be balanced.

Other objects and advantages of the invention will be apparent from the following description and drawings in which:

Fig. 1 is a side elevational view of a tool for balancing the front unpowered wheel of an automobile and which embodies the present invention, parts of the wheel and the hub nut thereof being shown in dotted lines.

Fig. 2 is an end elevational view thereof, viewed from the left hand end of Fig. 1.

Fig. 3 is a fragmentary longitudinal section through the front end of the tool, the rear end of the tool being broken off to permit illustration on the scale shown.

Fig. 4 is a view forming a continuation of Fig. 3, Fig. 4 being a section through the rear end of the tool the front of which is shown in section in Fig. 3.

Fig. 5 is a vertical section taken on line 5—5, Fig. 4.

Fig. 6 is a fragmentary vertical sectional view taken on line 6—6, Fig. 4.

Fig. 7 is a vertical section through the slipping clutch with parts thereof broken away, this section being taken on line 7—7, Fig. 3.

Fig. 8 is a vertical section taken on line 8—8, Fig. 3.

Fig. 9 is a vertical section, on an enlarged scale taken on line 9—9, Fig. 3.

Fig. 10 is an enlarged fragmentary sectional view through the disk member of the slipping clutch, this section being taken generally on the arcuate line 10—10, Fig. 7.

The various parts of the balancing equipment embodying the present invention are shown as carried by a main shaft tube 9 which forms the main body or backbone of the tool and extends substantially the full length thereof as shown in Figs. 3 and 4.

A forward stub shaft 10 is press fitted in the forward end of this main shaft tube 9, this forward stub shaft 10 having a threaded enlargement 11 at its forward end which fits against the front end of the main shaft tube 9. On this threaded enlargement 11 is screwed the hub 12 of an adapter cup 13, this adapter cup being additionally secured to the threaded end of the stub shaft 10 by a drive pin 14. In the adapter cup 13 is fitted the rim 15 of a cup-shaped adapter 16 and which is held in place by a set screw 18. The cup-shaped adapter 16 protrudes from the adapter cup 13 and its front wall is formed to provide a forwardly enlarging concentric tapered opening 19, the surface of which is roughened, in any suitable manner, to firmly engage the nut 20 of the stationary axle which carries the rotating body to be balanced, such as an unpowered front or steering wheel 21 of an automobile and which wheel is also shown as having the usual annular series of stud bolt nuts 22 by which the wheel is removably secured. The inner race of a ball bearing 25 is mounted on the hub 12 of the adapter cup 13 and the outer race of this ball bearing is fitted in the hub 26 of a front plate or disk 28, this front plate or disk having a peripheral flange 29 extending axially rearwardly and providing an internal flat clutch face 30 extending radially of the tool.

This front plate or disk 28 rotates with the wheel 21 and for this purpose a flexible connector 31 is provided between it and any one of the stud bolt nuts 22. While this connector can be of any suitable form it is shown as comprising a stud screw 32 secured to one of two oppositely located bosses 33 on the front disk or plate 28 and having an outwardly projecting stem on which is fitted a flexible tube 34. In the free end of this tube is fitted the stem of an open ring 35 which is made of spring wire so as to be readily slipped over any one of the nuts 22 and be releasably secured thereto.

On the forward end of the main shaft tube 9 is loosely fitted a tubular shaft 38 for the front plate or disk 28 so that this tubular shaft 38 is free to rotate around the main tube shaft 9. This tubular shaft 38 is provided with an enlargement 39 which abuts against the front disk or plate 28 and the forward end of the tubular shaft 38 is firmly fitted in the bore 40 of the front plate or disk so that this shaft 38 rotates with the front plate or disk shaft 28. This tubular shaft 38 for the front disk or plate 28 is provided with a rearward tubular extension 41 which is preferably slip fitted over the rear end of the tubular shaft 38 and is journalled on a pair of sleeve bearings 42. It will therefore be seen that the front disk or plate 28, together with its tubular shaft 38 and the tubular extension 41 of this shaft, is journalled on the main tube shaft 9 through the ball bearing 25 and sleeve bearings 42.

A pairs of bearings 43, 44, shown for simplicity as sleeve bearings but preferably in the form of needle bearings, are mounted on the tubular shaft 38 intermediate the enlargement 39 and tubular extension 41 of this shaft and another bearing 45 is mounted on the main tube shaft 9 in rear of the tubular shaft 38. The bearings 43, 44 and 45 carry a tubular shaft 50 which in turn carries the movable parts of a clutch. An important feature is that the bearing 45 is press fitted in the tubular shaft 50 and is journalled on the main tube shaft 9. This is for the reason that this bearing 45 is used as an abutment to move the tubular shaft 50 lengthwise to control the condition of the clutch.

This clutch comprises a collar 51 secured to the tubular shaft 50 by a set screw 52 having a forward tubular extension 53 providing a cylindrical bore 54 which is enlarged at its forward end as indicated at 55. In this forward enlargement 55 of the bore 54 is slidingly fitted a rearward cylindrical extension 56 of a pressure plate 58 in the form of a ring. This pressure plate or ring 58 is biased forwardly by an annular series of compression springs 59 housed in forwardly opening pockets 60 in an axial enlargement of the rim 61 of the cylindrical extension 53 of the collar 51.

This pressure plate or disk 58 is also provided on its front face with a coupling lug 62 which is arranged in a radial groove 63 in the rear face of a weight ring 64. A weight 66 is secured to one side of this weight ring in line with the groove 63. This weight 66 is shown as removably secured to the periphery of the weight ring by screws 68 and as having an indexing stripe or marker 70, such as a white stripe against a black background, painted centrally on the weight longitudinally of the tool. For use with the front wheels of automobiles this weight is preferably proportioned so that in the normal position of the parts it counterbalances one-half ounce of unbalance in the wheel 21 at the rim thereof and its effect is such under centrifugal force as to urge the weight ring 64 outwardly in a given radial direction when the tool is adjusted to counterbalance more than one-half ounce. At all adjustments of the tool in excess of one-half ounce the weight 66 together with the weight ring 64 serve to create a counterbalancing effect in unison. This weight ring is also provided with a large coaxial bore 71 and is biased by the pressure plate or ring 58 forwardly against the rear face of a clutch follower plate 72 in the form of a ring. This follower plate 72 is in engagement with the rear leather facing 73 of a disk clutch facing assembly 74. An important feature is that this follower plate 72 is fast to the forward end of the tubular shaft 50, this shaft being manually adjusted forwardly and rearwardly from a normal intermediate position to control the degree of pressure imposed on the clutch facings 74 by the follower plate 72. As best shown in Fig. 10, this disk clutch facing assembly 74 also includes a front leather facing 75 and between these two leather facings 73 and 75 is interposed a ring 76 of axially compressible spring material. The facings 73 and 75 can be made of leather and the center ring 76 can be made of screening, preferably deformed axially into sinusoidal form, as illustrated in Fig. 10, so as to have an increased yield in an axial direction. This yield is an important feature of the tool.

It will be seen that the tubular shaft 50, together with the follower plate 72 fast to its forward end and the collar 51 fast to its rear end, constitute a rotor which carries the weight 64, 66 and which is driven through the clutch disk facing assembly 74 by the front disk or plate 28.

The numeral 78 represents a forwardly diminishing cone slidably mounted on the sleeve 50 and its conical face engageable with a complementary conical rear end 80 of the bore 71 through the weight ring 64. Fastened to this cone 78 and projecting rearwardly therefrom are an annular series of thrust rods 81. These rods extend through the bore 54 of the collar 51 and through axial slideways 82 in this collar. The rear ends of these thrust rods 81 are anchored in a ring 83 slidingly mounted on the sleeve 50 in rear of the collar 51. It will therefore be seen that the sleeve 50, collar 51, thrust rods 81, collar 83, cone 78, thrust ring 58, weight ring 64 and clutch follower disk 72 rotate in unison.

The centrifugal force of the weight 66 on the weight ring 64 is impressed on the cone 78 so as to urge this cone rearwardly and, through the thrust rods 81, to urge the ring 83 against a thrust bearing 85 on the forward end of an external adjusting sleeve 86. This thrust bearing rotates with the ring 83 by virtue of a pin 87. This thrust bearing also is shown as comprising two half bearings held in embracing relation with a peripheral bead 88 on the external adjusting sleeve 86 by a spring ring 89 in an external peripheral groove provided in these two half bearings, and these half bearings are backed by an annular shoulder or flange 90 provided on the external adjusting sleeve 86. The thrust bearing 89 can be protected by a cylindrical sheet metal guard 91 which can be secured to the collar 83 by a screw 92 and which extends over the thrust bearing 89.

The external adjusting sleeve 86 is slidable but not rotatable upon the rear end of the sleeve 50 and its rear end is slidably supported on a collar 94 held by a set screw 95 on the main tube shaft 9. This external adjusting sleeve 86 also carries at its extreme rear end an inwardly projecting indexing pin 96 which is shown as being in the form of a screw held in position by a lock nut 98. The inner end of this pin 96 is adapted to be brought into engagement with any one of a helical series of stepped shoulders 99 in the wall of a sleeve 100, this sleeve 100 being mounted on a sleeve 101 which is mounted on and held stationary with respect to the main tube shaft 9 by a set screw 105 extending through an annular enlargement or bead 106 integral with the rear end of this sleeve 101. The adjusting sleeve 86 is slidable with respect to this sleeve 101 by virtue of a longitudinal slot 102 in the sleeve 101 into which the pin or screw 96 extends. The forward end of this sleeve 101 is provided with a head 103 housed within the external adjusting sleeve 86 and holding an oil seal ring 104 in this external adjusting sleeve.

The rear end of the sleeve 100 having the helical series of stepped shoulders 99 is shown as enlarged to provide a rotatable adjusting knob 108. This adjusting knob is cupped to provide a rearwardly opening annular pocket 109 housing a helical torsion spring 110. The forward end of this spring is suitably anchored in the rotatable adjusting knob 108 and the rear end of this spring is anchored in the enlargement 106 of the sleeve 101. The spring 110 rotatably biases the adjusting knob 108, and the sleeve 100 integral therewith in the direction to hold the helical series of stepped shoulders 99 of this last sleeve in engagement with the indexing pin or screw 96. The hub of the rotatable adjusting knob 108 bears against the enlargement or head 106 of the sleeve 101 and is provided with an annular series of calibration numbers 111 each corresponding in position to one of the shoulders 99 of the helical stepped series. These numbers 111 are shown as printed on a strip 112 of plastic or the like and which is secured to the adjusting sleeve 100 in embracing relation thereto by a screw 113. For automobile wheel balancing these numbers preferably represent increments of one-half ounce as measured at the rim of the automobile wheel 21. The index pointer or marker for these series of numbers 111 can be the pin or screw 96.

The extreme rear end of the main tube shaft 9 carries a sleeve 114 to which a laterally projecting handle 115 is attached. This sleeve and handle are secured to the main tube shaft 9 by a set screw 116. In rear of the sleeve 114 a collar 118 is rotatably mounted on the main tube shaft 9 and is provided with a forwardly projecting semicylindrical flange 119 which, as best shown in Figs. 4 and 5, embraces the side of the sleeve 114 opposite its handle 115. This semicylindrical flange is provided with an arcuate slot 120 through which the stem of a clamping screw 121 extends. This stem is screwed onto the sleeve 114 opposite the handle 115 and a washer 122 around this stem is pressed by the knurled knob 123 against the semicylindrical flange 119 so as to clamp this flange, and hence the collar 118, in any selected position of rotary adjustment.

The collar 118 is provided with a rearward arcuate projection 124 providing a pair of radially extending stop shoulders 125 and 126 which, as best shown in Figs. 4 and 6, cooperate with a stop pin 127 projecting forwardly from a clutch control knob 128 journalled on the rear extremity of the main tube shaft 9. A spring loaded ball detent 129 is also arranged in this arcuate projection 124 and is interposed between opposing faces of this clutch control knob 128 and the collar 118, the ball of this detent entering a recess 130 at a point intermediate the engagement of the stop shoulders 125 and 126 with the stop pin 127.

The clutch control knob 128 is turned by a handle 131 and a washer like thrust bearing 132 is interposed between it and the end of the main tube shaft 9. The rear end of the clutch control knob 128 also houses the front end of an adjusting nut 133. The adjusted position of this nut 133 with reference to the clutch control knob 128 is set by a set screw 134 in the clutch control knob and bearing against this adjusting nut 133.

This adjusting nut 133 is screwed on the rear end of a rear adjusting rod 135 which extends forwardly into the rear end of the main tube shaft 9 and terminates adjacent the collar 94 on this main tube shaft. The rear end of this adjusting rod 135 is provided with a flat 137 which mates a corresponding flat in the bore of the clutch control knob 128 so that this rod and knob are compelled to rotate in unison but the knob is positionable axially along the adjusting rod 135 through the adjustment of the adjusting nut 133.

The forward end of this adjusting rod 135 is provided with a threaded bore 136 in which is threaded the stem 138 of a front longitudinally movable adjusting rod section 139. This front adjusting rod section 139 is provided with a cross pin 140, the opposite ends of which protrude through longitudinal slots 141 in the main tube shaft 9 and into the annular space between this main tube shaft 9 and the sleeve 50. The race of a thrust ball bearing 142 is urged forwardly into engagement with this cross pin 140, this ball bearing being arranged between the main tube shaft 9 and the sleeve 50. To so bias the ball bearing 142 forwardly, it is backed by the bearing 45 which is in turn backed by another thrust bearing 144. A helical compression spring 145 is interposed between this last thrust bearing 144 and the collar 94 fast to the main tube shaft 9. As previously indicated the bearing 45 is fast to the tubular shaft 50 so that movement of this bearing under the influence of the cross pin 140 and spring 145 moves the tubular shaft 50.

The race of a thrust ball bearing 148 is slidingly mounted on the main tube shaft 9 and is yieldingly held against the rear end of the rearward extension 41 of the tubular shaft 38 for the front disk or plate 28 by a helical compression spring 149 seated against a ring 150 which is secured by a set screw 151 to the exterior of the main tube shaft 9.

*Operation*

In the operation of the present mechanism for balancing a rotating body, the body is rotated at a speed of, say, 1200 R. P. M. and it is assumed that the body is mounted in such manner that any unbalance in its weight will be detectable, visually, from vibration of a part of the structure to which it is connected. More specifically, when used to detect and correct unbalance in the unpowered steering wheels 21 of an automobile, the front end of the automobile is jacked up, and a drive mechanism rolled into position with a drive wheel engaging the tire of the wheel 21. This drive unit is provided with convenient controls for starting, stopping and braking the wheel 21 and for driving it at the assumed 1200 R. P. M. The degree of unbalance can be readily detected from some shiny part of the automobile body adjacent the wheel being balanced, such as the bumper. As the assumed drive mechanism forms no part of the present invention, it is not illustrated.

By way of generalization the mechanism of the present invention involves seven groups of parts. The first of these groups comprises the stationary parts which is held by the operator and on which all of the other parts are mounted. These parts, in balancing a front automobile wheel, are also coupled to the non-rotating hub nut 20 of the axle of this wheel. The second group is a rotor assembly including a rotor rotatably mounted on the first group and is arranged to be quickly coupled to the rotating body, such as the wheel to be balanced. The third group of parts comprises an eccentrically weighted weight ring which is carried by and rotates with the second group of parts or rotor assembly. The degree of unbalance of the weight ring structure is adjustable, for an automobile balancer, in increments of one-half ounce as applied at the radial distance equal of the rim of the wheel being balanced. The fourth group of parts comprises a slipping clutch between the parts rotating with the wheel and the rotor assembly carrying weight ring structure. This slipping clutch causes the weight ring structure to rotate out of synchronism at a slower speed than the wheel being balanced. Accordingly the eccentric weight of the weight ring rotates to a position where it is in phase with the weighted side of the automobile wheel when the unbalance of the two causes a high degree of vibration of the part being visually observed. The eccentric weight of the weight ring then travels 180° out of phase with the unbalancing weight of the wheel where minimum vibration is observed as the weights of the weight ring and wheel tend to balance each other. Accordingly the observed part is progressively subjected to maximum and minimum vibration as the eccentric weight ring travels into and out of phase with the unbalanced weight of the wheel. The fifth group of parts comprises a manual adjustment of the degree of eccentricity of the weight of the weight ring. For balancing an automobile wheel this is preferably in increments of one-half ounce as applied at the rim of an automobile wheel. By this adjustment the operator can increase the effective eccentric weight of the weight ring until when the weight of the weight ring travels through its 180° out of phase relation with the unbalance of the automobile wheel, there is no vibration of the part under visual observation. If the operator adjusts the effective weight of the weight ring too far, vibration of the part under observation at the minimum or 180° out of phase point will reappear and the operator is required to reduce the effective weight of the weight ring to achieve minimum vibration at this point. It will be seen that by calibrating this adjustment in half ounces, the operator is apprised exactly as to the amount of weight he will be required to apply to the rim of the automobile wheel to correct its unbalance. The sixth group of parts comprises a manual mechanism for coupling the weight ring to the parts rotating with the wheel so that they are compelled to rotate together. This is actuated after the effective weight of the weight ring has been adjusted to that point at which it counterbalances the eccentric weight of the automobile wheel as it travels 180° out of phase therewith. This coupling mechanism is also actuated when minimum or no vibration of the part under observation occurs, i. e. when the eccentric weights of the wheel and weight ring are 180° out of phase with each other. Accordingly when the wheel and parts of the tool are brought to rest the eccentric weight of the weight ring is located on that side of the automobile wheel requiring the addition of weight to balance it. Since the operator is apprised as to the amount of the weight to be added to the rim of the wheel and where along the rim of the wheel it should be added, it is a simple matter to add a weight of that value to that place on the rim and to balance the wheel. A seventh group of parts is provided for varying the rate of synchronization and desynchronization. Thus as a mechanic becomes more expert in the use of the tool, he can speed up the rate of synchronization and desynchronization to speed up the balancing process.

More in detail, in balancing the automobile wheel 21, the operator presses the roughened or knurled socket 19 of the adapter 16 of the adapter cup 13 at one end of the tool over the hub nut 20 of the automobile wheel 21. For different sized hub nuts different sized adapters 16 are used and it has been found that the tapered and roughened conical opening 19 provides a reliable grip on the nut, all three of these factors having been found essential to obtain this grip. This hub nut 22 does not, of course, rotate and the parts of the tool coupled to it by the adapter 16 comprise the first group as outlined, namely, the stationary parts. Following through this group from the adapter 16, the parts of this stationary group comprise the adapter cup 13, secured to the adapter by the set screw 18; the stub shaft 10 secured to this adapter cup 13 by the pin 14; the main shaft tube 9 which extends the full length of the tool; the collar 150 and the helical compression spring 149, the former being secured to the main tube shaft 9 by the set screw 151; the sleeve 101 secured to the main tube shaft 9 by the set screw 105; the sleeve 114 secured to the main tube shaft 9 by the set screw 116; and the handle 115 projecting from this last sleeve and which handle is grasped by the operator. Other parts are coupled to this stationary group of elements and which in normal operation do not rotate, but these other parts are adjusting parts and will be separately described as such.

The operator then engages the spring ring 35 with one of the rim nuts 22 of the wheel.

As stated, it is assumed that the front end of the automobile has been jacked up and that the drive wheel of a mobile drive unit (not shown) has been engaged with the tire of the wheel 21. The operator then energizes the drive unit to rotate the wheel 21 at a speed of, say 1200 R. P. M.

The rotation of the wheel 21 at this speed, through the coupling of one of its rim nuts 22 with the spring clip 35, flexible hose 31 and stud screw 32 rotates the second group of parts as outlined, namely, the group of parts rotatably mounted on the group of stationary parts and rotating with the part to be balanced. Following through this second group of parts from the flexible hose 34 and its stud screw 32, this group comprises the front plate 28 and its tubular shaft 38 journalled by the bearings 25 and 42 on the stationary hub of the adapter cup 13 and the stationary main body tube 9, respectively.

The third group of parts, as outlined, namely, the weight ring structure are independently rotatably mounted on the first two groups of elements generally concentric therewith and comprises the weight ring 64 and its eccentric weight 66, which weight ring 64 is journalled by the bearings 43, 44 and 45 on the rotating tube shaft 38 of the front disk 28 and the main shaft tube 9, respectively. The weight ring 64 is supported to so rotate relative to the group of stationary parts and the group of parts rotating with the wheel 21 by the adjusting cone 78, follower plate 72 of the slipping clutch, and the tubular shaft 50 journalled on these bearings 43, 44 and 45. Also rotating with the weight ring 64 and these supporting parts are the collar 51 secured to the tubular shaft 50 by the set screw 52; the ring 83 is secured to the thrust rods 81 which pass slidably through the collar 51 and are secured to the adjusting cone 78; the annular group of helical compression springs 59; and the pressure plate 58. The annular group of helical compression springs 59 and pressure plate 58 serve to hold weight ring 64 compressively against face of clutch follower 72. This compressive holding of weight ring 64 serves to stabilize the same when not in motion and subject to centrifugal force.

The fourth group of parts as outlined, namely, the slipping clutch, comprise the two leather facing disks 73 and 75 with the sinusoidally bent piece of screening 76 therebetween, this slipping clutch structure being interposed between the clutch follower disk 72 and the front plate 28 which rotates with the wheel 21. The normal expansive force exerted by the two leather facing disks 73 and 75 and the piece of screening 76 upon the clutch follower disk 72 and the front plate 28 is sufficient to develop a frictional relation between these parts. This frictional relation is dependent upon the space that exists between the clutch follower disk 72 and the front plate 28. As this space is increased the speed of the clutch disk 72 will be progressively less than front plate 28. As this space is decreased the speed of the clutch disk 72 will progressively approach the speed of the front plate 28. An important feature of the balancing mechanism is the imposition of a relatively constant load upon clutch at all times. This constant loading is, to a minor degree, obtained in bearings 43, 44, 45, 142 and 144. The major part of the loading is imposed by the sectional ring 85 and spring ring 89 acting upon the end of stationary flange 90.

The fifth group of parts as outlined, namely, the manual adjustment for the degree of eccentricity of the weight ring 64 and the weight 66 mounted on the periphery of this weight ring comprises the adjusting cone 78 and the means for manually adjusting this cone lengthwise of its axis. When this cone is adjusted forwardly its maximum extent it is tight in the conical part 80 of the bore 71 and the weight ring 64 is held concentric with the axis of the tool and its eccentric weight 66 the minimum distance from this axis. Accordingly the effect of this eccentric weight is adjusted to its minimum, this being for automobile wheels, one-half ounce calculated at the rim of an automobile wheel. When increase in the effect of the weight 66, say in increments of one-half ounce calculated at the rim of the wheel, is required, the adjusting cone 78 is moved rearwardly a corresponding distance. This brings a smaller part of the adjusting cone 78 in line with the conical bore 88 of the weight ring and since this permits lateral movement of the weight ring relative to this cone, the weight ring under the centrifugal forces acting on its weight 66, moves laterally so that its weight 66 is disposed at a greater distance from the axis of the tool and so that it exerts an increased effect as an eccentric weight.

This manual adjustment of the longitudinal position of the cone is effected by turning the sleeve 100, by its adjusting knob 108 against the resistance of its spring 110 and so as to bring the selected step 99 of the series of helical steps formed on this sleeve into register with the indexing pin 96. When the selected step 99 is brought into register with the pin 96 the helical spring 110 holds the selected step 99 in engagement with the indexing pin 96. These steps are calibrated in half ounce increments (calculated at the rim of the wheel being balanced) and if on the initial performance of the tool with the weight ring 64 concentric and the weight 66 alone eccentric to the degree representing one-half ounce out of balance at the rim of the wheel, the operator fails to secure full counterbalancing effect, he would turn the sleeve 100 by its adjusting part 108 so as to bring successive steps 99 into axial alinement with the indexing pin until proper counterbalance is noted.

This axial registry of the indexing pin 96 with this fifth step 99 of the helical series in the sleeve 100 permits this pin 96 and its adjusting sleeve 86 to be moved backwardly a corresponding distance. This permits a corresponding backward movement of the sleeve 86 carrying this pin; the split thrust bearing 89; the collar 83; the trust rods 81 and the adjusting cone 78. This backward movement of the adjusting cone 78 is induced by the pressure of the centrifugal force acting on the weight 66, but the sleeve 86 carrying the indexing pin 96 can be manually retracted or advanced axially to effect engagement between its pin 96 and any selected step 99, this sleeve being held against rotation by the indexing pin 96 riding in the slot 102 of the sleeve 101 which is fast to the main tube shaft 9 through the set screw 105. The thrust bearing 89 is such that it has constant frictional characteristics under all degrees of thrust and at all speeds of rotation.

The sixth group of parts as outlined, namely, the mechanism for fully controlling the clutch 74 is under manual control of the handle 131 at the extreme rear of the tool. In the running position of the clutch 74, that is, in which slippage takes place to provide a lower speed of rotation of the weight ring 64 as compared with the front plate 28, this finger piece 131 is in an intermediate position in which the spring loaded detent ball 129 is in the recess 130 provided therefor in the clutch control knob 128. In this position the axial pressure of the spring 145, through thrust bearing 144, bearing 45 and bearing 142 is exerted against pin 140. Since bearing 45 is fast to the tubular shaft 50 and the clutch follower is fast to the tubular shaft 50, the developed space between the clutch follower 72 and the front plate 28 is increased to a predetermined amount. This space is sufficient to permit the leather and screen disks 73, 75 and 76 to expand and develop a light frictional relation to the face of clutch follower 72 and the front plate 28. After the radial position of the weight 66 and the weight ring 64 have been adjusted to equal the unbalance of the wheel 21 under test and at the moment this weight 66 travels to a position 180° out of phase with the eccentric weight of the wheel under test, the operator swings the handle 131 at the rear of the tool counterclockwise, as viewed from the rear of the tool, as far as it will go, this being until the pin 127 on the clutch control knob 128 engages the shoulder 125 of the segmental projection 124 of the collar 118 as best illustrated in Fig. 6. This movement of the control knob 128, through the flat 137 on the screw shaft 135 (Fig. 4) turns this screw shaft so as to move the longitudinally movable adjusting rod 139 (Fig. 3) forwardly. This movement of this adjusting rod is caused by its screw connection 136 with the rod 135 and by the cross pin 140 which prevents the adjusting rod 139 from turning with reference to the main tube shaft 9.

The forward movement of this longitudinally movable adjusting rod 139 and its pin 140 permits the spring 145 to move forwardly the bearings 144, 45 and 142 pressed by this spring 145 against this cross pin 140. Since the bearing 45 is fast to the tubular shaft 50 and since the clutch follower disk 72 is fast to the forward end of this tubular shaft 50, the pressure of this spring 145 is exerted against the part 73, 76 and 75 of the slipping clutch to fully engage these parts with each other and with the follower plate 72 and front plate 28 and thereby cause the weight ring 64 to rotate with the front plate 28. Since at this time the weight 66 on the weight ring 64 is 180° out of phase with the eccentric weighting of the wheel 21 under test, when this wheel 21 is brought to rest the radial position of the weight 66 will show exactly where a balancing weight should be applied to the rim of the wheel 21 to balance it. The weight in half ounces of this balancing weight 66 and the weight ring 64 together, as described, had been previously determined by the position of the indexing pin 96 with reference to the calibrated numerals 111, these calibrations being in increments of one-half ounces as applied to the rim of the wheel 21.

In the event the operator wishes to open fully the clutch 74, he turns the handle 131 at the rear of the tool clockwise to its extreme position, this extreme position being determined (Fig. 6) by engagement of the stop pin of the clutch control knob 128 with the shoulder 126 on the collar 118. This movement of this clutch control knob 128 turns the screw 135 to back up the longitudinally movable adjusting rod 139 (Fig. 3) and thereby cause the cross pin to move the bearings 142, 45 and 144 rearwardly against the resistance of the spring 145. Since the bearing 45 is fast to the tubular shaft 50 and since the clutch follower disk 72 is fast to this tubular shaft, this relieves axial pressure on the parts 73, 76 and 75 of the slipping clutch and fully opens this clutch.

The seventh group of parts as outlined, namely, the mechanism for setting the differential in speed between the front plate 28 and the weight ring 64 to suit the skill of the operator, comprises the adjusting screw 121 at the extreme rear of the tool. Loosening this adjusting screw (Fig. 5) permits rotation of the collar 118 to any desired position, this being permitted by the slot 120. After this collar 118 has been set to the desired position the screw 121 is retightened. Since this collar 118 carries the segmental projection 124 carrying the detent ball 129 and since this detent ball determines the normal operating position of the clutch control knob 128, it will be seen that this adjustment of the collar 118 by loosening and retightening the screw 121 adjusts the degree of slippage of the clutch parts 74 in normal operation. The greater this slippage the slower the rotation of the weight ring 64 with reference to the front plate 28 and wheel 21 and the faster the weight 66 of this weight ring will travel into and out of phase with the unbalancing weight to be corrected on the wheel 21. As an operator becomes more expert in observing the degree of freedom from vibration as these weights travel 180° out of phase with each other and as he becomes more expert in closing the clutch parts 74 at this 180° point where balance is shown, he will increase the speed of the weight ring 64 with reference to the face plate 28 to cause more rapid movement of the weights into and out of phase with each other.

By "rotor" as used in the accompanying claims is meant the tubular shaft 50 together with the follower plate 72 fast to its forward end and the collar 51 fast to its rear end. This rotor carries the variable eccentric weight 64, 66 and, through the clutch disk facing assembly 74, is driven by the front plate or disk 28 at a speed different from this front plate or disk 28 so as to cause the rotor and its variable eccentric weight to scan the unbalanced wheel 21.

From the foregoing it will be seen that the present tool provides a simple mechanical device which is directly applied to the rotating part to be balanced and which can easily be adjusted to indicate not only the amount of counterbalancing weight required to be added, but also where this weight should be added to counterbalance the part. It will also be seen that the tool accomplishes the various objects set forth.

We claim:

1. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with the longitudinal axis thereof, means arranged to drive said rotor continuously at a speed different from said rotating body to cause said rotor to scan said rotating body, an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be positioned radially to counterbalance said overweighted section of said rotating body, and manually operated means arranged to arrest said eccentric weight with relation to said unbalanced section at that time when a condition of counter-balance therebetween is established.

2. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with the longitudinal axis thereof, means arranged to drive said rotor continuously at a speed different from said rotating body to cause said rotor to scan said rotating body, an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be positioned radially to counterbalance said overweighted section of said rotating body, and means arranged to indicate the phase relationship of said eccentric weight and the overweighted section of said rotating body to permit of the application of a counterweight to said rotating body at the proper angular position to balance the same.

3. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with the longitudinal axis thereof, means arranged to drive said rotor continuously through power derived from said rotating body at a speed different from said rotating body to cause said rotor to scan said rotating body, an eccentric weight carried by said rotor, and a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be positioned radially to counterbalance said overweighted section of said rotating body.

4. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with the longitudinal axis thereof, means arranged to drive said rotor continuously through power derived from said rotating body at a speed less than said rotating body to cause said rotor to scan said rotating body, an eccentric weight carried by said rotor, and a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be positioned radially to counterbalance said overweighted section of said rotating body.

5. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis thereof, a slipping clutch arranged to couple said rotating body and rotor and driving said rotor through power derived from said rotating body at a speed less than said rotating body to cause said rotor to scan said rotating body, an eccentric weight carried by said rotor, and a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be positioned radially to counterbalance said overweighted section of said rotating body.

6. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis thereof, a slipping clutch arranged to couple said rotating body and rotor and driving said rotor through power derived from said rotating body at a speed less than said rotating body to cause said rotor to scan said rotating body, means arranged to apply a constant load on said slipping clutch, an eccentric weight carried by said rotor, and a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be positioned radially to counterbalance said overweighted section of said rotating body.

7. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis thereof, a slipping clutch arranged to couple said rotating body and rotor and driving said rotor through power derived from said rotating body at a speed less than said rotating body to cause said rotor to scan said rotating body, an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be adjusted to counterbalance said overweighted section of said rotating body, and means arranged to fully couple said slipping clutch manually whereby said slipping clutch can be coupled at a predetermined phase relationship of said eccentric weight and the overweighted section of said rotating body so that when said rotating body and rotor are brought to rest the position of said rotor with reference to said rotating body will indicate the correct angular position to apply a counterweight to said rotating body to balance the same.

8. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotary plate journalled on one axial end of said stationary part generally concentric with its longitudinal axis, means arranged to couple said rotary plate with said rotating body to rotate therewith, a rotor mounted on said stationary part on the side of said rotary plate remote from said rotating body and to rotate generally concentric with said longitudinal axis, a slipping clutch arranged intermediate and to couple said rotary plate and rotor and driving said rotor through power derived from said rotating body at a speed less than said rotating body to cause said rotor to scan said rotating body, an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to be adjusted to counterbalance said overweighted section of said rotating body, and means arranged to fully couple said slipping clutch manually whereby said slipping clutch can be coupled at a predetermined phase relationship of the eccentrically weighted side of said rotor and the overweighted section of said rotating body so that when the rotor and rotating body are brought to rest the position of said rotor with reference to said rotating body will indicate the correct angular position to apply a counterweight to said rotating body to balance the same.

9. A mechanism for balancing a body rotating about a stationary axle and having an overweighted section, comprising a stationary main tube shaft adapted to be held with its longitudinal axis generally in line with said axle of said rotating body, a coupling fixed to said stationary main tube shaft and adapted to be connected with said axle to provide a flexible non-rotative connection between said stationary main tube shaft and axle and transmitting to said stationary main shaft vibrations generated by said rotating body and vice versa, a rotary plate journalled on one end of said main tube shaft, means arranged to couple said rotary plate with said rotating body to rotate therewith, a rotor mounted on said main tube shaft on the side of said rotary plate remote from said rotating body and to rotate generally concentric with said longitudinal axis, a slipping clutch arranged intermediate and arranged to couple said rotary plate and rotor and driving said rotor through power derived from said rotating body at a speed less than said rotating body to cause said rotor to scan said rotating body, an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to counterbalance said overweighted section of said rotating body, a manually movable control member at the end of said main tube shaft remoted from said rotating plate, and means actuated by said manually movable control member and extending through said main tube shaft and arranged to fully couple said slipping clutch whereby said clutch can be coupled at a predetermined phase relationship of said eccentric weight of said rotor and the overweighted section of said rotating body so that when the rotor and rotating body are brought to rest the position of said rotor with reference to said rotating body will indicate the correct angular position to apply a counterweight to said rotating body to balance the same.

10. In a mechanism for balancing a body rotating about a stationary axle and having an overweighted section, a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotary plate journalled on said stationary part, means arranged to couple said rotary plate with said rotating body to rotate therewith, a rotor mounted on said stationary part adjacent said rotary plate and to rotate generally concentric with said longitudinal axis, a plurality of clutch disks interposed between said rotary plate and said rotor and at least one of which clutch disks is composed of an axially yieldable material, means interposed between said stationary part and rotor and arranged to apply a constant load on said clutch disks, means holding said rotor and rotary plate in an adjustable spaced relation to each other to provide a predetermined degree of slippage of said clutch disks and to drive said rotor through power derived from said rotary plate at a speed less than said rotating body to cause said rotor to scan said rotating body, and an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to counterbalance said overweighted section of said rotating body.

11. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body, and vice versa, a rotary plate journalled on said stationary part, means arranged to couple said rotary plate with said rotating body to rotate therewith, a rotor mounted on said stationary part adjacent said rotary plate and to rotate generally concentric with said longitudinal axis, a plurality of clutch disks interposed between said rotary plate and said rotor and one of which clutch disks is composed of axially yieldable woven wire, means interposed between said stationary part and rotor and arranged to apply a constant load on said clutch disks, means holding said rotor and said rotary plate in an adjustable spaced relation to each other to provide a predetermined degree of slippage of said clutch disks and to drive said rotor through power derived from said rotary plate at a speed less than said rotating body to cause said rotor to scan said rotating body, an eccentric weight carried by said rotor, and a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to counterbalance said overweighted section of said rotating body.

12. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis, a manually adjustable slipping clutch arranged to couple said rotating body and rotor and driving said rotor through power derived from said rotating body at a speed less than said rotating part to cause said rotor to scan said rotating body, an eccentric weight carried by said rotor, a manually adjustable means arranged to vary the radial position of said eccentric weight while rotating, the scanning action of said rotor causing said eccentric weight to pass into and out of phase alternately with the overweighted section of said rotating body and said manually adjustable means permitting said eccentric weight to counterbalance said overweighted section of said rotating body, and means arranged to indicate the value of the effective force to which said eccentric weight has been adjusted thereby to determine the size of counterweight to be applied to the rotating part to balance the same.

13. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis, an eccentric weight on said rotor, a slipping clutch arranged to couple said rotating body and rotor and driving said rotor through power derived from said rotating body at a speed less than said rotating body whereby said eccentric weight is caused to scan said rotating body by being brought into and out of phase with the overweighted section of said rotating body, means arranged to adjust the radial position of said eccentric weight whereby the value of the effective force of said eccentric weight can be brought to substantially counterbalance the overweighted section of said rotating body as said eccentric weight travels through a 180° out of phase relation with said overweighted section of said rotating body, and means arranged to indicate the value of the effective force to which said eccentric weight has been adjusted thereby to determine the size of counterweight to be applied to the rotating body to balance the same.

14. A mechanism for balancing a body rotating about a stationary axle and having an overweighted section, comprising a stationary main shaft adapted to be held with its longitudinal axis generally in line with said axle of said rotating body, a coupling fixed to said stationary main shaft and adapted to be connected with said axle to provide a flexible, non-rotative connection between said stationary main shaft and axle and transmitting to said stationary main shaft vibrations generated by said rotating body and vice versa, a rotary plate journalled on one end of said main shaft, means arranged to couple said rotary plate with said rotating body to rotate therewith, a rotor mounted on said main shaft on the side of said rotary plate remote from said rotating body and to rotate generally concentric with said longitudinal axis, an eccentric weight on said rotor, a slipping clutch arranged intermediate and arranged to couple said rotary plate and rotor and driving said rotor through power derived from said rotating body at a speed less than said rotating body whereby said eccentric weight is caused to scan said rotating body by being brought into and out of phase with the overweighted section of said rotating body, a manually movable control member mounted on the part of said main shaft remote from said rotating body, means actuated by said control member and arranged to adjust the radial position of said eccentric weight whereby the value of the effective force of said eccentric weight can be brought to substantially counterbalance the overweighted section of said rotating body as said eccentric weight travels through a 180° out of phase relation with said overweighted section of said rotating body, and means arranged to indicate the value of the effective force to which said eccentric weight has been adjusted thereby to determine the size of counterweight to be applied to the rotating body to balance the same.

15. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis, a weight ring having a bore through which said stationary part extends, means arranged to support said weight ring on said rotor to rotate therewith, an eccentric weight on said weight ring, a slipping clutch arranged to couple said rotating body and rotor and driving said rotor through power derived from said rotating body whereby said eccentric weight is caused to scan said rotating body by being brought into and out of phase with the overweighted section of said rotating body, manual means on said stationary part for adjusting the radial position of said weight ring whereby the value of the effective force of said eccentric weight and said weight ring together can be brought to substantially counterbalance the overweighted section of said rotating body as said eccentric weight travels through a 180° out of phase relation with said overweighted section of said rotating body, and means arranged to indicate the value of the effective force to which said eccentric weight has been adjusted thereby to determine the size of counterweight to be applied to the rotating body to balance the same.

16. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a weight ring having a bore through which said stationary part extends, a rotor mounted on said stationary part to rotate generally concentric with said longitudinal axis, means arranged to support said weight ring on said rotor to rotate therewith an eccentric weight on said weight ring, a slipping clutch arranged to couple said rotating body and rotor and driving said rotor through power derived from said rotating body whereby said eccentric weight is caused to scan said rotating body by being brought into and out of phase with the overweighted section of said rotating body, manual means on said stationary part for adjusting the radial position of said weight ring whereby the value of the effective force of said eccentric weight and said weight ring together can be brought to substantially counterbalance the overweight section of said rotating body as said eccentric weight travels through a 180° out of phase relation with said overweighted section of said rotating body, said manual means comprising a cone mounted for movement along said longitudinal axis on said stationary part and fitting said bore of said weight ring and means for manually positioning said cone axially with reference to said weight ring, and means arranged to indicate the position of said cone with reference to said weight ring thereby to indicate the value of the effective force to which said eccentric weight has been adjusted and the size of the counterweight which must be applied to the rotating body to balance the same.

17. A mechanism for balancing a body rotating about a stationary axle and having an overweighted section, comprising a stationary main shaft adapted to be held with its longitudinal axis generally in line with said axle of said rotating body, a coupling fixed to said stationary main shaft and adapted to be connected with said axle to provide a flexible, non-rotative connection between said stationary main shaft and axle and transmitting to said stationary main shaft vibrations generated by said rotating body and vice versa, a rotary plate journalled on one end of said main shaft and held against axial movement relative thereto, means arranged to connect said rotary plate with said rotating body to rotate therewith, a weight ring arranged on the side of said rotary plate remote from said rotating body and having a bore through which said main shaft extends, an eccentric weight on said weight ring, clutch disks interposed between said weight ring and rotary plate and forming a slipping clutch driving said weight ring through motion derived from said rotating body whereby said eccentric weight is caused to scan said rotating body by being brought into and out of phase with the overweighted section of said rotating body, manual means on said main shaft for adjusting the radial position of said weight ring whereby the value of the effective force of said eccentric weight and said weight ring together can be brought to substantially counterbalance the overweighted section of said rotating body as said eccentric weight travels through a 180° out of phase relation with said overweighted section of said rotating body, comprising a longitudinally movable cone on said main shaft and in one position fitting the bore of said weight ring, a sleeve movable longitudinally on said main shaft and held against rotation relative thereto, means including a thrust bearing connecting said cone and sleeve to move axially in unison but permitting said cone to rotate relative to said sleeve, means releasably holding said sleeve at different axial positions of adjustment along said shaft, and a scale on said sleeve to indicate the position thereof and the value of the effective force to which said eccentric weight has been adjusted.

18. A mechanism for balancing a body rotating about a stationary axle and having an overweighted section, comprising a stationary main shaft adapted to be held with its longitudinal axis generally in line with said axle of said rotating body, a coupling fixed to said stationary main shaft and adapted to be connected with said axle to provide a flexible, non-rotative connection between said stationary main shaft and axle and transmitting to said stationary main shaft vibrations generated by said rotating body and vice versa, a rotary plate journalled on one end of said main shaft and held against axial movement relative thereto, means arranged to connect said rotary plate with said rotating body to rotate therewith, a weight ring arranged on the side of said rotary plate remote from said rotating body and having a bore through which said main shaft extends, an eccentric weight on said weight ring, clutch disks interposed between said weight ring and rotary plate and forming a slipping clutch driving said weight ring through motion derived from said rotating body whereby said eccentric weight is caused to scan said rotating body by being brought into and out of phase with the overweighted section of said rotating body, manual means on said main shaft for adjusting the radial position of said weight ring whereby the value of the effective force of said eccentric weight and said weight ring together can be brought to substantially counterbalance the overweighted section of said rotating body as said eccentric weight travels through a 180° out of phase relation with said overweighted section of said rotating body, comprising a longitudinally movable cone on said main shaft and in one position fitting the bore of said weight ring, a sleeve movable longitudinally on said main shaft and held against rotation relative thereto, means including a thrust bearing connecting said cone and sleeve to move axially in unison but permitting said cone to rotate relative to said sleeve, a pin projecting radially from said sleeve, a sleeve rotatably mounted on said main shaft and having a helical series of stepped indentations each movable to engage said pin and hold said pin at a corresponding position lengthwise of said main shaft, a spring interposed between said main shaft and said stepped sleeve and biasing said sleeve in a rotary direction to maintain engagement between said pin and any selected step of said helical series, and a scale on said stepped sleeve to indicate the position thereof and the value of the effective force to which said eccentric weight has been adjusted.

19. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis, an eccentric weight on said rotor, means arranged to drive said rotor at a speed different from said rotating body whereby the said eccentric weight is caused to scan said rotating body by being brought into and out of phase with the overweighted section of said rotating body, means arranged to indicate the phase relationship of said eccentric weight and the overweighted section of said rotating body to permit the application of a counterweight to said rotating body at the proper angular position to balance the same, means arranged to adjust the radial position of said eccentric weight while said rotor is rotating whereby the value of the effective force of said eccentric weight can be brought to substantially counterbalance the overweighted section of said rotating body as said eccentric weight travels through a 180° out of phase relation with said overweighted section of said rotating body, and means arranged to indicate the value of the effective force to which said eccentric weight has been adjusted thereby to determine the size of counterweight to be applied to the rotating body to balance the same.

20. A mechanism for balancing a body rotating about a stationary axle and having an overweighted section, comprising a stationary part adapted to be held with its longitudinal axis generally in line with said axle of said rotating body, a coupling fixed to said stationary part and adapted to be connected with said axle to provide a flexible non-rotative connection between said stationary part and axle and transmitting to said stationary part vibrations generated by said rotating body and vice versa, a rotor mounted on said stationary part to rotate generally concentric with said longitudinal axis, an eccentric weight on said rotor, a slipping clutch arranged to couple said rotating body and rotor and driving said rotor through power derived from said rotating body at a speed less than said rotating body whereby said eccentric weight is caused to scan said rotating body by being brought into and out of phase with the overweighted section of said rotating body, means arranged to indicate the phase relationship of the overweighted section of said rotating body and said eccentric weight of said rotor to permit of the application of a counterweight to said rotating body at the proper angular position to balance the same, means arranged to adjust the radial position of said eccentric weight whereby the value of the effective force of said eccentric weight can be brought to substantially counterbalance the overweighted section of said rotating body as said eccentric weight travels through a 180° out of phase relation with said overweighted section of said rotating body, and means arranged to indicate the value of the effective force to which said eccentric weight has been adjusted thereby to determine the size of counterweight to be applied to the rotating body to balance the same.

21. A mechanism for balancing a body rotating about a stationary axle and having an overweighted section, comprising a stationary main tube shaft adapted to be held with its longitudinal axis generally in line with said axle of said rotating body, a coupling fixed to said stationary main shaft and adapted to be connected with said axle to provide a flexible, non-rotative connection between said stationary main shaft and axle and transmitting to said stationary main shaft vibrations generated by said rotating body and vice versa, a rotary plate journalled on one end of said main tube shaft, means arranged to couple said rotary plate with said rotating body to rotate therewith, a rotor mounted on said main tube shaft on the side of said rotary plate remote from said rotating body to rotate generally concentric with said longitudinal axis, an eccentric weight on said rotor, a slipping clutch arranged intermediate and to couple said rotary plate and rotor and driving said rotor through power derived from said rotating body at a speed less than said rotating body whereby said eccentric weight is caused to scan said rotating body by being brought into and out of phase with the overweighted section of said rotating body, a manually movable control member at the end of said main tube shaft remote from said rotating plate, means actuated by said manually movable control member and extending through said main tube shaft and arranged to fully couple said slipping clutch whereby said clutch can be coupled at a predetermined phase relationship of said eccentric weight of said rotor and the overweighted section of said rotating body so that when the rotor and rotating body are brought to rest the position of said rotor with reference to said rotating body will indicate the correct angular position to apply a counterweight to said rotating body to balance the same, a second manually movable control member mounted on the part of said main tube shaft remote from said rotating body, means actuated by said second control member and arranged to adjust the radial position of said eccentric weight whereby the value of the effective force of said eccentric weight can be brought to substantially counterbalance the overweighted section of said rotating body as said eccentric weight travels through a 180° out of phase relation with said overweighted section of said rotating body, and means arranged to indicate the value of the effective force to which said eccentric weight has been adjusted thereby to determine the size of counterweight to be applied to the rotating body to balance the same.

22. In a mechanism for balancing a wheel having an overweighted section and rotating about a stationary axle having a hub nut secured to said axle, a stationary main shaft, a cup fixed to one end of said main shaft and having a frusto-conical roughened opening generally concentric with said main shaft and enlarging in a direction opposite from said main shaft and adapted to grip said nut, a rotor journalled on said main shaft on the side of said cup remote from said wheel, a weight eccentrically positioned on said rotor, a rotary plate journalled on said main shaft on the side of said cup remote from said wheel, means releasably connecting said plate and wheel to rotate in unison, a slipping clutch interposed between said rotor and plate and permitting said eccentrically positioned weight on said rotor to rotate relative to the overweighted section of said wheel, means for adjusting the radial position of the eccentrically positioned weight on said rotor to substantially counterbalance the overweighted section of said wheel as said eccentrically positioned weight on said rotor passes through a 180° out of phase relation with said overweighted side of said wheel, and means arranged to manually fully engage said slipping clutch as said eccentrically positioned weight on said rotor passes through a 180° out of phase relation with said overweighted section of said wheel.

23. A mechanism for balancing a body rotating about a stationary axle and having an overweighted section, comprising a stationary part to be held with its longitudinal axis generally in line with said axle of said body, a coupling fixed to said stationary part and adapted to be connected with said axle to provide a flexible non-rotative connection between said stationary part and axle, said coupling effecting full transfer of vibrational energy from said rotating body to said stationary part and vice versa, an eccentric mass mounted upon said stationary part to rotate about the said axis thereof, means arranged to rotate said mass about said axis of said stationary part at a speed different from said rotating body, a manually adjustable means arranged to vary the effective eccentric position of said mass while it is rotating to counterbalance said overweighted section, a manually adjustable means arranged to control the differential in speed between said rotating body and eccentric mass to cause the adjusted mass to scan said body and bring said adjusted mass into and out of phase with said overweighted section, and a manually adjustable means arranged to arrest said adjusted mass with respect to said rotating body to cause said adjusted mass and body to rotate in unison when said counterbalance is established between the said overweighted section of said body and said adjusted eccentric mass.

References Cited in the file of this patent
UNITED STATES PATENTS
1,398,333   Lundgren _____ Nov. 29, 1921